April 4, 1961    L. H. MORIN    2,978,202
RIBBED BARREL MOULDED PLASTIC SPOOLS
Filed Jan. 10, 1955
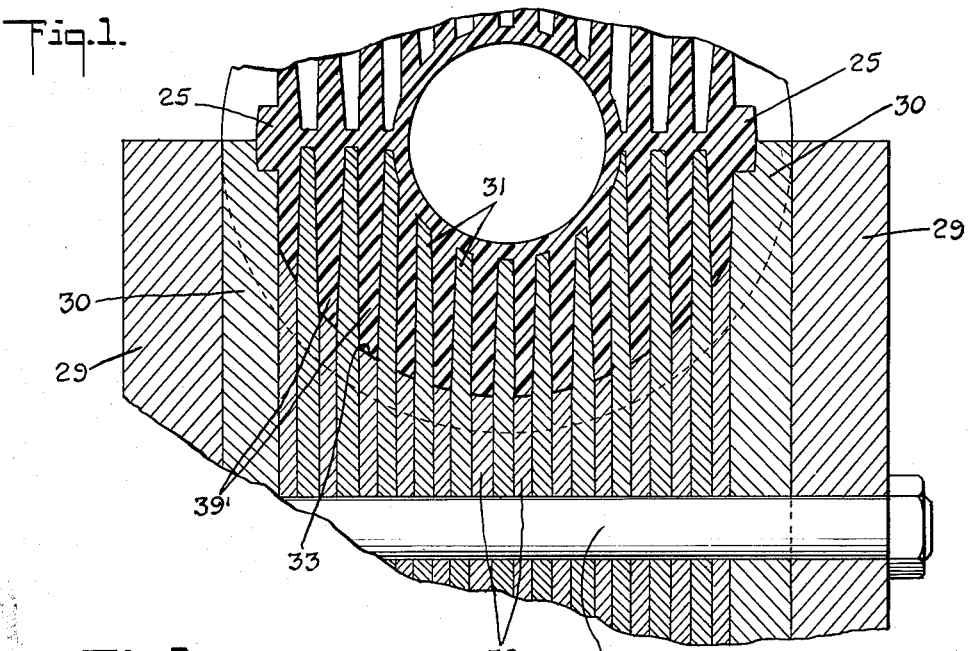
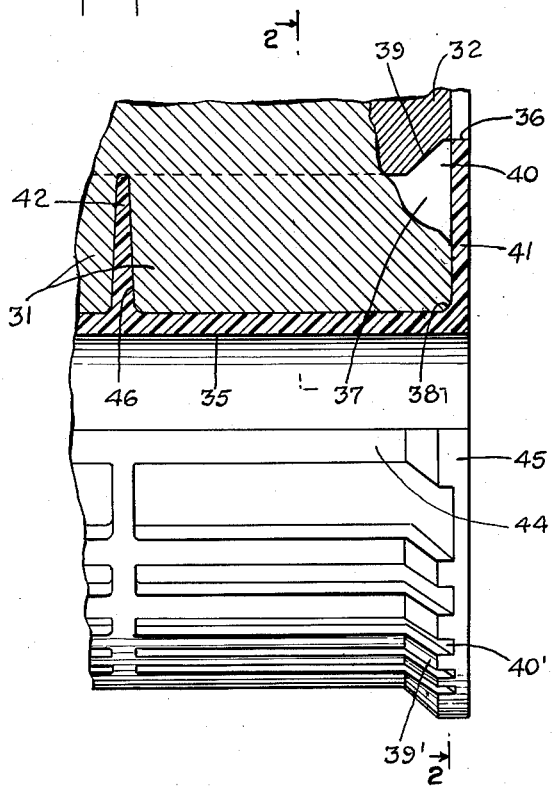
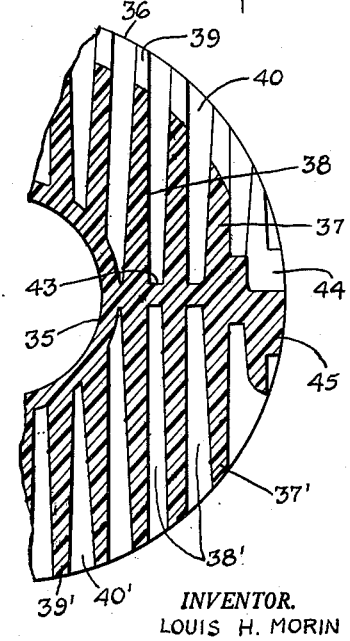
INVENTOR.
LOUIS H. MORIN
BY
*Howard Thompson*
ATTORNEY.

United States Patent Office 2,978,202
Patented Apr. 4, 1961

2,978,202

RIBBED BARREL MOULDED PLASTIC SPOOLS

Louis H. Morin, Bronx, N.Y., assignor to Coats & Clark Inc., New York, N.Y., a corporation of Delaware Filed Jan. 10, 1955, Ser. No. 480,899

2 Claims. (Cl. 242—118.7)

This invention relates to moulded plastic spools used for the mounting of thread and other strands thereon. More particularly, the invention deals with a spool structure, wherein the barrel portion of the spool is formed with a plurality of oppositely extending circumferentially spaced parallel ribs on opposed sides of the barrel for minimizing the amount of plastic material employed in the construction of the spool and in providing, throughout the wall structure of the hollow spool, substantially common wall thicknesses, thereby obviating distortion to the moulded spool in setting of the moulded material.

Still more particularly, the invention deals with a novel die structure comprising a multiplicity of die plates for producing moulded spools of the character defined in a simple and economical manner.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a sectional view, showing the lower portion of the spool and diagrammatically showing part of the die structure for moulding the spool body.

Fig. 2 is a sectional view, showing one side portion only of a spool body and taken along line 2—2 of Fig. 3; and Fig. 3 is a side and sectional view of one end portion of the spool shown in Fig. 2 and diagrammatically indicating, in broken section, parts of the die, generally similar to the die shown in Fig. 1, for forming the spool of Figs. 2 and 3.

In production of hollowed spool bodies and, particularly, in producing hollowed barrel and rim portions, I have produced a simple and economical type of die structure, whereby the spool barrel can be formed with, opposed parallel ribs, correspondingly spaced recesses or grooves, which present, circumferentially of the barrel portion of the spool, surfaces facilitating the winding of thread or strands thereon. The invention is applicable to the deep spool or, in other words, the spool employing a relatively small diameter barrel, as well as to the large diameter barrel commonly employed in what is termed the shallow spool structure.

In Fig. 1 of the drawing, I have shown, in section, the lower portion of a spool, such as illustrated in Fig. 2 of the drawing, as well as part of the die structure employed for moulding the spool body and, in said figure, 29 represents a die holder supporting end pieces 30 for moulding the lands 25 and between the end pieces 30 are a multiplicity of coring die plates 31 with intermediate spacer plates 32, exposed surfaces 33 of which form outer peripheral surfaces or extremities of the ribs 39'. At this time, it is pointed out that a similar die is used for moulding the opposed half of the spool or, in other words, in moulding the ribs 39.

The end portions of the plates 31, beyond the spacer die plates 32, may be said to comprise fingers tapering outwardly to a slight extent, as clearly shown; thus producing the outer taper of the ribs 39' and this construction facilitates free displacement of the moulded spool body when the dies are separated.

By employing a die structure of the type and kind under consideration, a simple and economical means is provided for moulding the spool body with the deep grooves or spaces 38, 38' therein. In this connection, it will be apparent that, by utilizing individual plates, formation of the die, particularly in shaping the tapered ends of the plates, is facilitated.

In Fig. 1 of the drawing, I have shown at 34 a bolt which is mounted in the die holder and passes through the several plates and end pieces employed in retaining the same in proper assemblage in the holder 29. Two or more bolts are preferred.

In Figs. 2 and 3 of the drawing, I have shown a form of spool structure, wherein the ribs and grooves and recesses are extended into part of the spool rim. In said figure, 35 represents the central tubular portion of the spool body, 36 the end rim, one end portion only of the spool body being shown, it being apparent that both ends are of the same construction.

At 37, 37' are shown ribs. At 38, 38' are shown slots or grooves. The primary feature of the structures shown in Figs. 2 and 3 resides in extending the ribs and the spaces or grooves onto the rim ends, or at least, part thereof, the rib extensions being indicated at 39, 39' and the spaces or grooves at 40, 40'. This construction leaves the spool end with an end plate 41 which extends from the outer end of the tubular portion 35 to the outer periphery of the rim 36, as clearly illustrated at the upper portion of Fig. 3 of the drawing.

At 42 I have shown a circumferentially continuous rib, which divides the rib and groove structure into separate side portions on the resulting spool body, as clearly illustrated.

In Fig. 3 of the drawing, I have shown, diagrammatically in broken section, part of one die plate 31, and at 32 I have shown a spacer die plate, it being understood that the die plates 31 and 32 are modified to the extent of forming the spool structure illustrated in Figs. 2 and 3 of the drawing.

In Fig. 2 of the drawing, I have shown part of a radial rib 43. At the outer portion of the rib 43 is an enlarged land 44, which is in circumferential alinement with outer extremities of the ribs 37, 37' and which, in conjunction with the ribs 37, 37', forms parts of the barrel structure of the spool or, in other words, that part of the spool upon which the thread or strands are wound. In will also appear, from a consideration of Figs. 2 and 3 of the drawing, that the land 44 extends into circumferentially large portions 45 on the rim 36.

It will also appear from a consideration of Fig. 3 of the drawing that the finger end portions of the plates 31, 31' are separated by annular grooves to form, for example, the circular rib 42, and one of these grooves is shown at 46 in Fig. 3 of the drawing in illustrating the separation of the plate fingers 31 into two groups. It will, of course, be apparent that a similar structure and arrangement is provided in the die illustrated in Fig. 1 of the drawing.

It will be apparent that Fig. 1 of the drawing diagrammatically illustrates the type of die structure which can be utilized in producing moulded spool bodies, generally of the type and kind herein disclosed and the die plates, such for example as the plates 31, 32, can be characterized to produce the desired contour or structural arrangement of the resulting spool body.

Having fully described my invention, what I claim as new and desire to secure by Letters Patent is:

1. A light weight, plastic thread spool comprising end rims and a barrel having a central bore, said central bore being completely free and being defined by a continuous, cylindrically shaped, inner wall surface that forms a part of said barrel, a multiplicity of circumferentially spaced weight reducing slots in the barrel opening through the outer cylindrical surface thereof, said slots having inner ends that are closed, said slots being substantially parallel to one another, each slot, when viewed in side elevation, having a substantially rectangular outline, a rib between each pair of neighboring slots, said ribs and slots extending onto said rims and terminating at the outer periphery thereof and a rib extending radially outward from opposite sides of said inner wall surface to the outer periphery of said barrel in a plane passing through the longitudinal axis of said spool.

2. A plastic spool comprising a cylindrical barrel, end rims, said barrel being defined by a radially inwardly disposed, circumferentially continuous, tubular wall having circumferentially spaced ribs extending outwardly therefrom on opposite sides thereof, the ribs on each said side extending in parallel direction to each other, the ribs on one side extending opposite to but in a direction parallel with respect to the ribs of the opposed sides, each pair of next adjacent ribs having a weight reducing slot therebetween, at least some of said slots having an inner side that is closed off by said tubular wall, all of the slots having an open outer side, and said tubular wall also having radial ribs extending outwardly therefrom and disposed at right angles to said circumferentially spaced ribs, said ribs and slots extending longitudinally and continuously from said barrel onto said end rims and terminating at the outer periphery of said rims and a circumferentially continuous rib extending from said tubular wall to the outer periphery of said barrel in a plane at right angles to the longitudinal axis of said spool and substantially midway between the ends of said spool.

References Cited in the file of this patent

UNITED STATES PATENTS

| | | |
|---|---|---|
| 1,867,309 | Etzkorn | July 12, 1932 |
| 2,140,497 | Deters | Dec. 20, 1938 |
| 2,225,632 | Herman | Dec. 24, 1940 |
| 2,266,887 | McCoy | Dec. 23, 1941 |
| 2,277,224 | Grauer | Mar. 24, 1942 |
| 2,341,333 | Purinton | Feb. 8, 1944 |
| 2,654,549 | Rappleyea | Oct. 6, 1953 |
| 2,693,323 | Jarmicki | Nov. 2, 1954 |
| 2,759,681 | Rissberger et al. | Aug. 21, 1956 |
| 2,775,418 | Cadman | Dec. 25, 1956 |

FOREIGN PATENTS

| | | |
|---|---|---|
| 235,297 | Great Britain | June 11, 1925 |
| 362,798 | Great Britain | Dec. 10, 1931 |
| 367,780 | Great Britain | Feb. 17, 1932 |
| 682,692 | Great Britain | Nov. 12, 1952 |
| 265,489 | Switzerland | Sept. 16, 1950 |